UNITED STATES PATENT OFFICE.

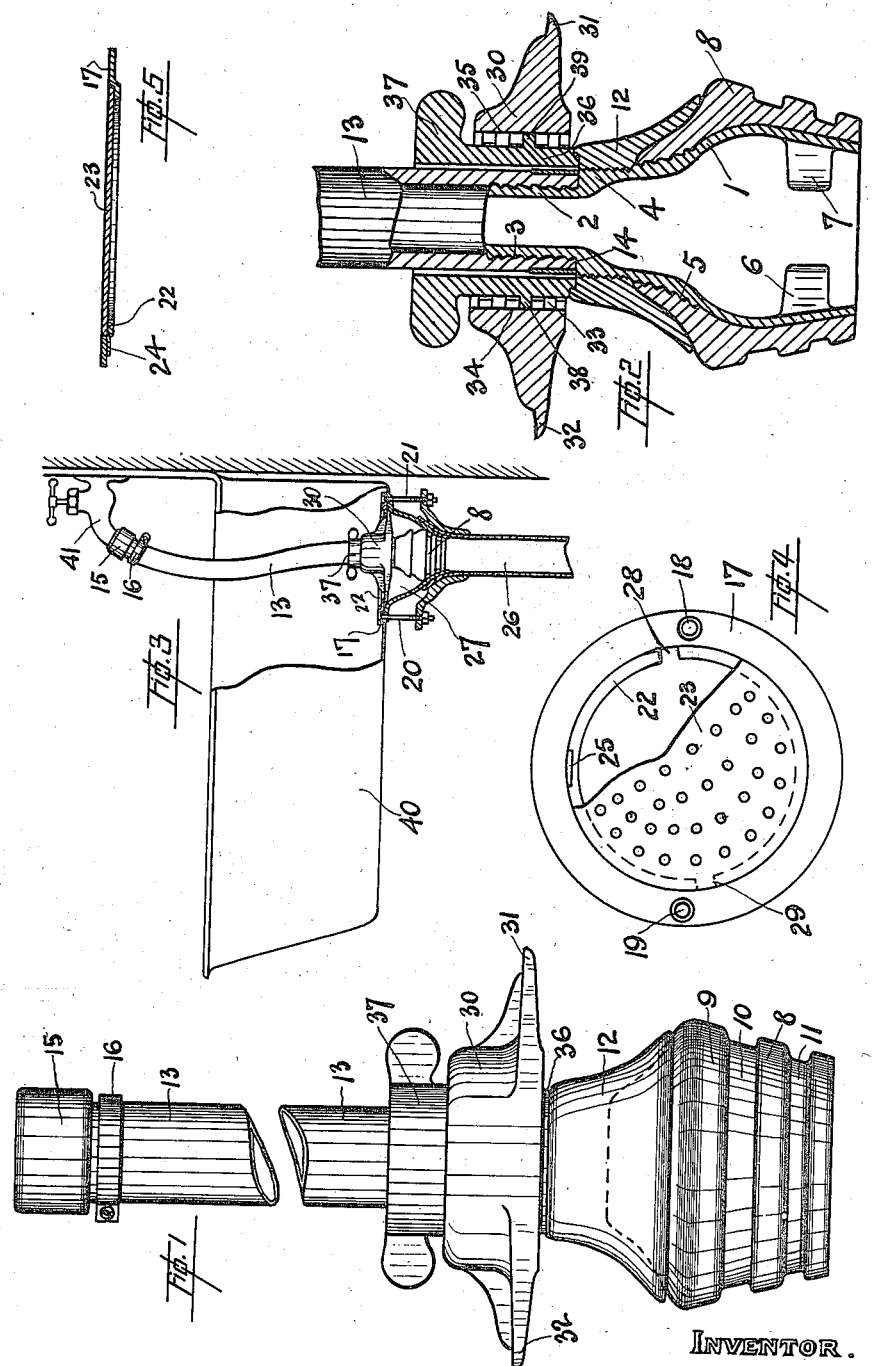

WILLIAM WELLS CAVERLEY, OF VANCOUVER, BRITISH COLUMBIA, CANADA.

SINK-PIPE-CLEANING DEVICE.

1,271,853.  Specification of Letters Patent.  Patented July 9, 1918.

Application filed October 2, 1917. Serial No. 194,394.

*To all whom it may concern:*

Be it known that I, WILLIAM WELLS CAVERLEY, a subject of the King of Great Britain, and a resident of the city of Vancouver, in the Province of British Columbia, Canada, have invented certain new and useful Improvements in Sink-Pipe-Cleaning Devices, of which the following is a specification.

My invention relates to improvements in devices for cleaning the drain pipes of sinks and the like when the same are choked, and the object of my invention is to provide a simple and effective means the use of which enables the pipe to be positively cleared of the obstructing matter and which means may be employed and operated, with equal facility, by unskilled persons as well as by those skilled in the art, such as plumbers and those employed in kindred trades, thereby providing a device which is of great convenience and utility in the household.

I attain this object by the means illustrated in the accompanying drawings in which—

Figure 1 is an assembled view of my device.

Fig. 2 is a sectional view of the lower end of the same.

Fig. 3 is a view illustrating the practical application of my invention.

Fig. 4 is a plan view of the drain plate and its seat; the drain plate being shown partly broken.

Fig. 5 is a cross sectional view of the drain plate and seat.

Similar figures of reference indicate similar parts throughout the several views.

1 indicates an inverted substantially bell-shaped nozzle tapered inwardly toward its mouth, the upper end of which nozzle is reduced to form a tubular extension 2 exteriorly corrugated or rough-threaded as indicated by the numeral 3 in Fig. 2, while extending downwardly from the tubular extension 2 the periphery of the nozzle is formed as an enlarged exteriorly threaded portion 4 immediately below which the outer surface of the nozzle is, for a short distance downwardly, corrugated or rough-threaded, as at 5 in Fig. 2. 6 and 7 indicate lugs formed on the inside of the mouth of the nozzle by means of which it may be held when the parts are being assembled.

Mounted on the periphery of the nozzle and completely surrounding the bell-shaped end of the same is a plug 8, formed of any suitable resilient material such as rubber, which plug is substantially the same contour as the bell of the nozzle and is provided on its downwardly and inwardly tapering periphery 9 with grooves 10 and 11. The plug extends upwardly to surround the corrugated portion 5 and is held in place by means of a bell shaped nut 12 threaded on to the portion 4, the nut 12 being screwed hard down on to the plug so as to squeeze the inner surface of its upper end into the corrugations 5 and thus secure the plug rigidly to the nozzle 1 while at the same time insuring the formation of a tight joint therebetween.

13 indicates a piece of rubber hose of suitable length into the lower end of which the tubular extension is inserted and securely attached thereto by means of a ring 14, indicated in Fig. 2, which ring is passed around the hose and compressed and crimped so as to squeeze the hose into the corrugations of the extension 2, while the upper end of the hose is provided with the usual coupling nut 15 and clamp 16.

17 indicates a flat ring adapted to be fitted around the sink outlet, replacing the usual perforated drain plate with which sinks are fitted, and which ring is provided with countersink holes 18 and 19 so that it may be secured in place by the sink pipe bolts, these being indicated in Fig. 3 by the numerals 20 and 21. A seat 22 is formed in the ring 17 adapted to receive a perforated drain plate 23, this plate being removably connected to the ring 17 by means of a tongue 24 with which it, the plate, is provided, which tongue engages a slot 25, formed in the ring at one side of the same, from which it will be seen that the drain plate 23 may be lifted clear of the ring 17 when required without removing the bolts 20 and 21, leaving the mouth of the sink-pipe 26 clear. The bore of the seat 22 is less in diameter than that of the sink outlet 27 so that the underside of the seat projects slightly over the outlet, as indicated in Fig. 3, and slots 28 and 29 are cut through the seat on opposite sides thereof, as shown in Fig. 4.

30 indicates a collar or flange adapted to surround loosely the hose pipe 13, which collar is provided with outwardly extending diametrically opposite lugs 31 and 32, the thickness of the lugs and the diameter over their points being such that they may be passed through the slots 28 and 29, as hereinafter more fully described. The bore of the collar is provided with a square thread 33 and with a pair of diametrically opposite slots 34 and 35, and rotatably fitted in the bore of the collar is a tubular extension 36 forming part of a thumb nut 37, the bore of which nut and its extension fits freely around the hose pipe 13. At suitable points on the periphery of the extension 36 diametrically opposite to each other and adapted to fit slidably the slots 34 and 35 are projections 38 and 39, which projections are also adapted to fit the thread 33 so that when the extension 36 is placed in the bore of the collar 30 the projections 38 and 39 may be engaged in the thread 33, enabling the extension 36 to be screwed downwardly or upwardly, as the case may be, by means of its thumb nut upper portion 37.

40 indicates a typical sink, partly broken away on one side to show the application of my invention thereto, and 41 indicates the water tap therefor.

Having thus indicated the principal parts of my invention I will now describe the manner in which it is used.

In order to clean, with my device, the sink-pipe of an existing sink fitted with the ordinary perforated drain plate when the same becomes choked, the bolts 20 and 21 are withdrawn and the plate removed, the ring 17 being fitted in its place and rigidly secured by the bolts 20 and 21 which are passed through the holes 18 and 19. The drain plate 23 is, of course, meantime laid aside until the cleaning operation is completed. The device, assembled as shown in Fig. 1, is then taken and the plug 8 is inserted in the sink-pipe, as shown in Fig. 3, the lugs 31 and 32 of the collar 30 being passed down through the slots 28 and 29, after which the collar is given a slight turn to the right or left so that the lugs will be out of alinement with the slots, from which it will be evident that the collar cannot now be withdrawn, as the lugs then engage the underside of the seat 22. The nut 37 is then screwed downwardly so that the point of its extension 36 bears on the upper end of the nut 12, and thus the plug 8 is forced downwardly and held tightly into the sink-pipe, making a tight joint therewith so that there can be no loss of pressure therefrom when the water is turned on, the collar 30 and the nut 37 acting as a strut to prevent its upward movement. The upper end of the hose pipe 13 may now be connected to the tap 41, and the water turned on, when the pressure in the pipe below the plug will force out the obstructing matter, after which the device may be removed by unscrewing the nut 37, withdrawing the collar lugs 31 and 32 up through the slots 28 and 29, removing the plug 8, and uncoupling the hose from the tap 41. The drain plate 23 is then laid in the seat 22, since the ring 17 remains as a permanent fixture.

It may be here mentioned that any dents or inequalities in the surface of the pipe covered by the plug 8 are filled by the plug when the pressure is created in the pipe, as the water enters under pressure at the joint between the bell shaped nozzle 1 and the plug and expands the latter to fill the inequalities mentioned. It is not absolutely necessary to make the bell shaped nozzle the same length as the plug 8 as long as it is sufficiently long to form a foundation for the mounting of the plug thereon, in which case the bore of the plug below the nozzle is acted upon directly by the pressure in the pipe so that the plug is expanded thereby.

It will be seen from the foregoing that I have devised a practical and efficient sink-pipe cleaning device which is simple and inexpensive to construct while at the same time being convenient and easy to operate.

What I claim as my invention is:—

1. A sink pipe cleaning device comprising, a tubular connection having one end adapted for coupling to a water service and having its opposite end formed as a nozzle adapted to fit the said pipe so that its peripheral surface will form a joint therewith, a strut having an interiorly threaded bore mounted on said tubular connection adapted to be secured across the mouth of the sink-pipe, and a nut coöperating with the bore of said strut whereby the said nozzle may be jammed in place.

2. For use with a sink and sink-pipe, a plate ring surrounding the sink outlet of less diameter than the same and provided with diametrically opposite slots, a tubular connection having one end adapted for coupling to a water service and having its opposite end formed as a nozzle adapted to fit the said pipe so that its peripheral surface will form a joint therewith, a strut mounted on said tubular connection the ends of which are adapted to pass through the slots of the said plate ring to engage the underside of the same, and vertically adjustable means extending between said strut and the said nozzle and bearing directly on the nozzle.

Dated at Vancouver, B. C., this 21st day of September, 1917.

WILLIAM WELLS CAVERLEY.